United States Patent
Shibayama et al.

(10) Patent No.: US 6,257,056 B1
(45) Date of Patent: Jul. 10, 2001

(54) METHOD OF INSPECTING CORNERING CONTROL MECHANISM OF VEHICLE

(75) Inventors: Takao Shibayama; Kazuyuki Fukamachi; Keiichiro Maekawa, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/114,280

(22) Filed: Jul. 13, 1998

(30) Foreign Application Priority Data

Jul. 17, 1997 (JP) .................................... 9-192752

(51) Int. Cl.⁷ ...................................................... G01L 5/28
(52) U.S. Cl. ............................................................ 73/129
(58) Field of Search ........................ 73/129; 364/426.02; 303/40, 103, 100

(56) References Cited

U.S. PATENT DOCUMENTS

| | | |
|---|---|---|
| 5,058,423 | 10/1991 | Ozaki et al. . |
| 5,115,678 | 5/1992 | Ozaki et al. . |
| 5,329,453 * | 7/1994 | Ysuyama et al. ............... 364/426.02 |
| 5,402,676 * | 4/1995 | Shibayama et al. .................... 73/117 |
| 5,483,823 | 1/1996 | Shibayama et al. . |

FOREIGN PATENT DOCUMENTS 2 284 271    5/1995 (GB) .

* cited by examiner

Primary Examiner—Benjamin R. Fuller
Assistant Examiner—Octavia Davis
(74) Attorney, Agent, or Firm—Armstrong, Westerman, Hattori, McLeland & Naughton, LLP

(57) ABSTRACT

While a vehicle is running on a bench type of testing apparatus for inspecting a cornering control mechanism, the connection of one of drums on which one of the left and right driving wheels is mounted is released from the other drums. Then, the rotational speed of one of the driving wheels increases and the rotational speed of the other of the driving wheels decreases. At this time, a controller mounted on the vehicle judges that the vehicle is in an oversteering state, and the brake of one of the driving wheels is switched on (or operated). Then, based on the deceleration of one of the driving wheels, a discrimination is made as to whether the cornering control mechanism has operated normally or not. Since the rotational speed of one of the driving wheels decreases also when an accelerator is switched off (or pressing down of the accelerator pedal is released), a discrimination is made based on the deceleration of the other of the driving wheels as to whether the accelerator is switched off or not. When a discrimination is made that the accelerator has been switched off, the discrimination of operation of the cornering control mechanism based on the deceleration of one of the driving wheels is prohibited.

2 Claims, 3 Drawing Sheets

METHOD OF INSPECTING CORNERING CONTROL MECHANISM OF VEHICLE

BACKGROUND OF THE INVENTION

1. Field of the Invention

The present invention relates to a method of inspecting a cornering control mechanism which independently controls right and left brakes at the time of oversteering or understeering of a vehicle such as a motor vehicle, whereby the vehicle is brought closer to neutral steering.

2. Description of the Related Art

The cornering control mechanism has the following arrangement. Namely, signals from a lateral G (gravity) sensor, a yaw rate sensor, a steering angle sensor, and a wheel speed sensor are inputted into a controller. Based on the signals from these sensors, there are computed an angular velocity of revolution (i.e., revolution around the center of turning curvature) and an angular velocity of rotation (i.e., rotation on a vertical axis of rotation of the vehicle). When the angular velocity of rotation has exceeded the angular velocity of revolution, a judgement is made that the vehicle is oversteered and, therefore, a braking force is applied to the wheels on an outer side of cornering by the operation of a brake. When the angular velocity of rotation has become smaller than the angular velocity of revolution, a judgement is made that the vehicle is understeered and, therefore, a braking force is applied to the wheels on the inner side of cornering by the operation of the brake.

The inspection of this kind of cornering control mechanism is conventionally made in an actual running method in which the vehicle actually runs on a test course or in an electronic simulation system in which simulated signals are inputted into a controller to see whether or not the controller outputs an appropriate brake control signals.

The actual running method must depend for its judgement on a driver's driving senses and therefore lacks in reliability. Further, because of the time required for the inspection, it is impossible to perform the inspection on all of the vehicles. In the electronic simulation system, on the other hand, the functions of the controller can be inspected, but an overall inspection including the sensors and the brake cannot be made. This system therefore has a problem in the point of quality guarantee.

In view of the above points, the present invention has an object of providing an inspection method in which the inspection of the cornering control mechanism can be performed on a bench type of testing apparatus by running or driving the vehicle thereon.

SUMMARY OF THE INVENTION

In order to attain the above and other objects, the present invention is a method of inspecting a cornering control mechanism of a vehicle in which a braking force is applied to wheels on an outer side of cornering when the vehicle is oversteered and a braking force is applied to wheels on an inner side of cornering when the vehicle is understeered, said inspection being performed in a state in which each of the wheels is placed on each drum of a bench type of testing apparatus, said method comprising the steps of: driving driving wheels of the vehicle by a driving source of the vehicle in a state in which all of the drums are coupled to each other via respective clutches; releasing the coupling of one of the drums on which one of the left and right driving wheels is mounted, to the other of the drums when a vehicle speed has reached a predetermined speed; detecting subsequent deceleration of said one of the driving wheels and subsequent deceleration of the other of the driving wheels; discriminating whether the cornering control mechanism has operated normally or not based on the deceleration of said one of the driving wheels; discriminating, based on the deceleration of the other of the driving wheels, whether an accelerator has been switched off; and when a discrimination is made that the accelerator has been switched off, prohibiting the discrimination of operation of the cornering control mechanism based on the deceleration of said one of the driving wheels.

In a state in which all of the drums are coupled to each other, idler wheels of the vehicle are driven by the driving wheels via the drums for the driving wheels and those drums for the idler wheels which are coupled to the drums for the driving wheels. As a result, a load is applied to the driving wheels. When the drum for one of the driving wheels is released of coupling to the other drums, the load on said one of the driving wheels is reduced and the rotational speed of said one of the driving wheels is increased. By the operation of a differential gear which is mounted on the vehicle between both the driving wheels, the rotational speed of the other of the driving wheels is reduced. Then, a controller which is mounted on the vehicle judges that the vehicle is in an oversteering state in which an angular velocity of rotation has exceeded an angular velocity of revolution (the angular velocity of revolution is zero when the vehicle is in a straight-running condition). The controller therefore operates the brake of that one of the driving wheels which lies on the outer side of cornering to apply a braking force thereto. Once the braking force is applied to said one of the driving wheels as described above, said one of the driving wheels is decelerated. Based on this deceleration, a discrimination can be made as to whether the cornering control mechanism has operated normally or not.

When the operator releases the pressing down of the accelerator pedal (i.e., switches off the accelerator), said one of the driving wheels is decelerated even if the cornering control mechanism does not operate. Therefore, a wrong discrimination will be made if only the deceleration of said one of the driving wheels is being monitored. It is to be noted here that, when the accelerator is switched off, the deceleration of the other of the driving wheels also becomes large. Therefore, a discrimination can be made as to whether the accelerator has been switched off based on the deceleration of the other of the driving wheels. In the present invention, when the discrimination is made that the accelerator has been switched off, the discrimination of operation of the cornering control mechanism based on the deceleration of said one of the driving wheels is prohibited. A wrong judgement can thus be prevented.

While the accelerator is being switched off, the braking force is sometimes applied to said one of the driving wheels by the operation of the cornering control mechanism. In order to increase the accuracy of the judgement, whether the cornering control mechanism is acceptable or not, it is desired to make it possible to discriminate whether the braking force is applied to said one of the driving wheels or not even while the accelerator is switched off. The deceleration of said one of the driving wheels changes largely on the instant when the braking force is applied. Even when the accelerator is switched off, a discrimination can be made, based on the degree of change in deceleration of said one of the driving wheels, as to whether the braking force is applied or not. However, since the deceleration of said one of the driving wheels also largely changes on the instant when the accelerator is switched off, it is necessary to prohibit the discrimination of operation based on the degree of change in deceleration at the time when the accelerator is switched off. Here, since the deceleration of the other of the driving wheels also largely changes at the time of switching off of the accelerator, the time at which the accelerator is switched off can be discriminated based on the degree of change in the deceleration of the other of the driving wheels. Therefore, by discriminating that the braking force is applied to said one of the driving wheels when a rate of change in the deceleration of the other of the driving wheels is below a first predetermined value and when the rate of change in the deceleration of said one of the driving wheels is above a second predetermined value, the operation of the cornering control mechanism can be accurately discriminated during the period while the accelerator is switched off. The accuracy of judgment of acceptability and non-acceptability can thus be improved.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
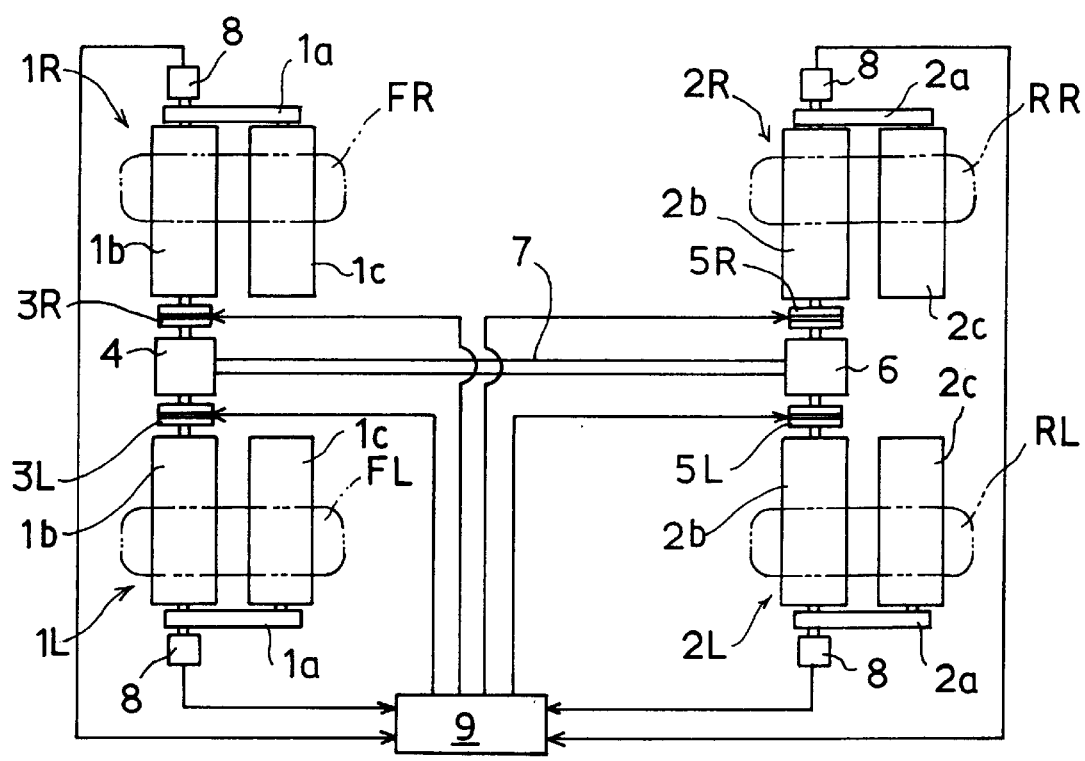
FIG. 1 is a plan view of a bench type of testing apparatus which is used in performing the method of the present invention.
Figure 2:
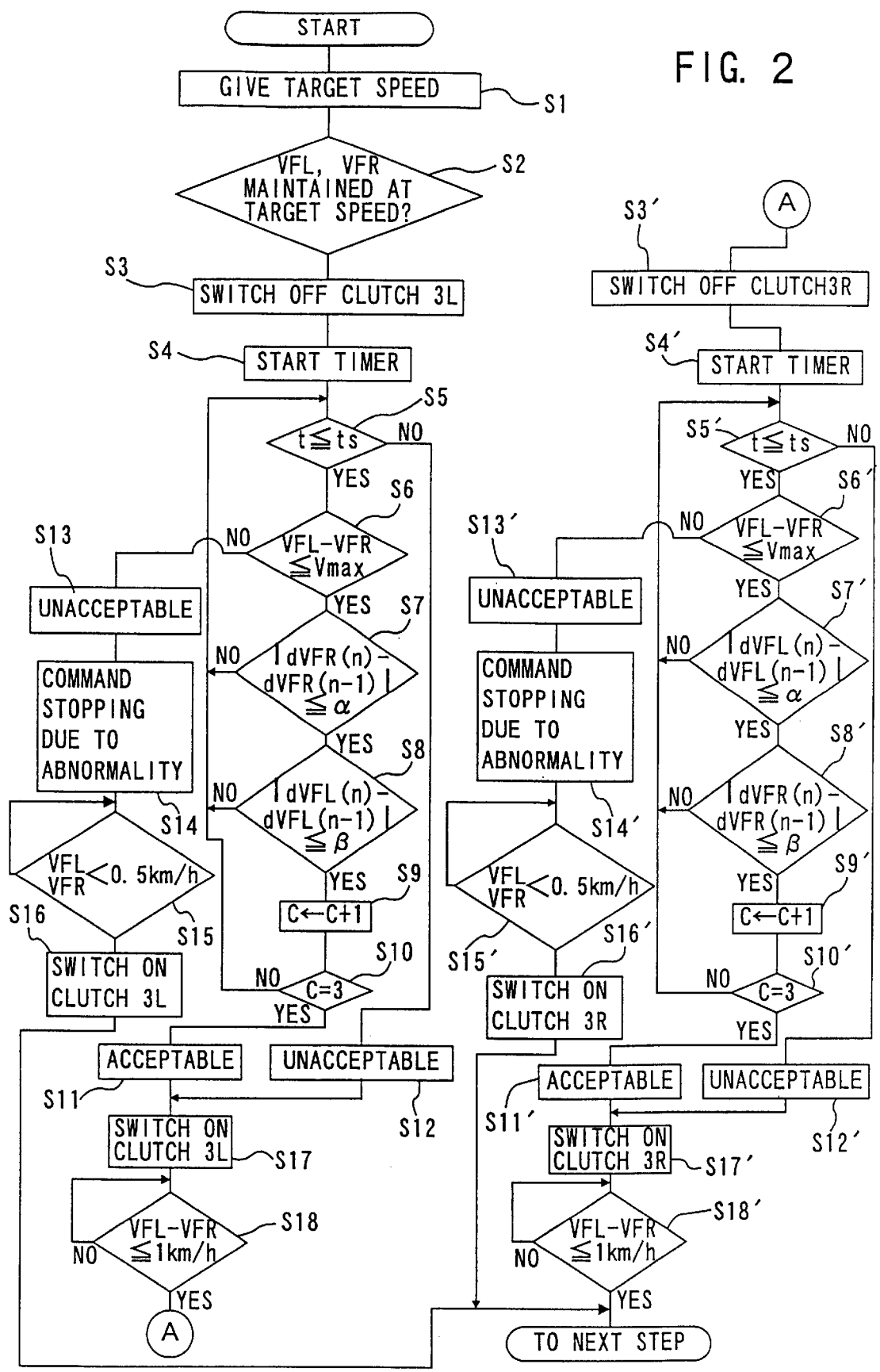
FIG. 2 is a flow chart to show one example of inspecting procedures according to the present invention.

FIG. 1 shows a bench type of testing apparatus, i.e., a testing apparatus mounted on a bench or a supporting base. This testing apparatus is provided with a left and right pair of drums 1L, 1R for the front wheels and left and right pair of drums 2L, 2R for the rear wheels. Between the pair of drums 1L, 1R for the front wheels, there is disposed a gear box 4 to which is connected each of the drums 1L, 1R via respective clutches 3L, 3R. Between the pair of drums 2L, 2R for the rear wheels, there is disposed a gear box 6 to which is connected each of the drums 2L, 2R via respective clutches 5L, 5R. Both the gear boxes 4, 6 are connected to each other via a coupling shaft 7.

Each of the drums 1L, 1R, 2L, 2R is constituted by a pair of front and rear divided drums 1b, 1c; 2b, 2c which are connected together via a belt 1a, 2a so as to rotate synchronously. To each of the divided front drums 1b, 2b there is connected the above-described clutch 3L, 3R, 5L, 5R as well as a speedometer 8. Signals from these speedometers 8 are inputted into a processing unit 9.

In performing the inspection of a cornering control mechanism, left and right pair of front wheels FL, FR and left and right pair of rear wheels RL, RR are placed on each of the corresponding drums 1L, 1R, 2L, 2R. In a state in which all of the clutches 3L, 3R, 5L, 5R are engaged (or switched on), the driving wheels are driven by an engine which is a vehicle-mounted driving source. The vehicle is thus caused to run (or to be driven) on the bench type of testing apparatus. In this case, if the vehicle is a front-wheel driven vehicle, the rear wheels RL, RR, which serve as idler wheels, are driven via the front-wheel drums 1L, 1R, the clutches 3L, 3R, the gear box 4, the coupling shaft 7, the gear box 6, the clutches 5L, 5R and the drums 2L, 2R for the rear wheels. If the vehicle is a rear-wheel driven vehicle, the front wheels FL, FR, which serve as the idler wheels, are driven in the path which is opposite to that mentioned above.

An explanation will now be made about the inspecting procedures of the cornering control mechanism in a front-wheel driven vehicle.

First, by a monitor (not illustrated) which is disposed near the bench type of testing apparatus, a target speed (e.g., 20 km/h) is given to an operator or a driver of the vehicle (S1). Then, a discrimination is made as to whether those speeds VFL, VFR of the front wheels which are detected by the speedometers 8 have continuously maintained the target speed or not for a predetermined period of time (e.g., 1 second) (S2). If the target speed has been attained, an operation inspection of cornering control mechanism is performed on one of the right and left front wheels, e.g., the front left wheel FL. Then, the operation inspection of cornering control mechanism is performed on the right front wheel FR.

In more detail, first, the clutch 3L for the left front drum 1L is disengaged (or switched off) to thereby release the connection of the drum 1L to the other drums 1R, 2L, 2R (S3). Then, a timer is started (S4). A discrimination is made as to whether the time t of the timer is below a predetermined time ts (e.g., 4 seconds) or not (S5). If $t \leq ts$, a discrimination is made as to whether the speed difference between the left front wheel FL and the right front wheel FR (=VFL−VFR) is below a predetermined upper limit value Vmax (e.g., 30 km/h) or not (S6). Then, if VFL−VFR$\leq$Vmax, a discrimination is made as to whether the cornering control mechanism has operated normally or not based on the deceleration dVFR of the right front wheel FR and the deceleration dVFL of the left front wheel FL.

Figure 3:
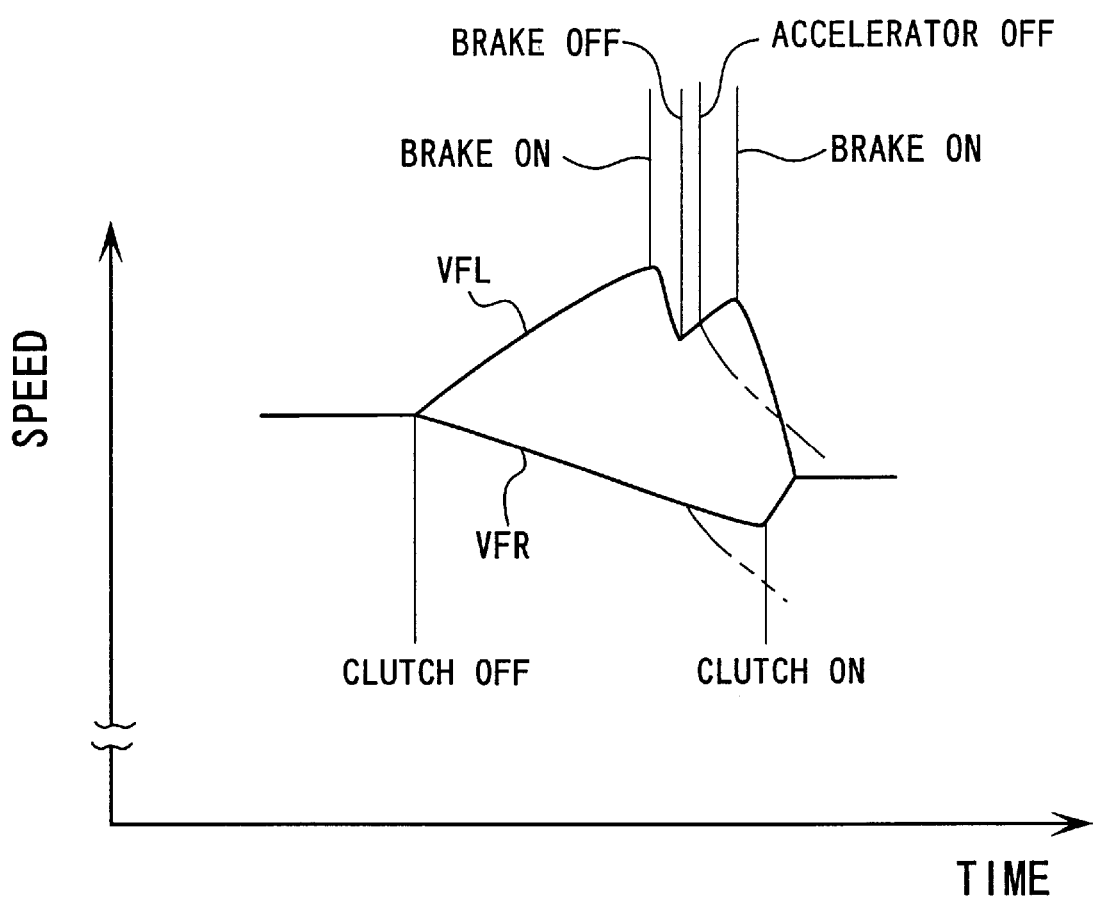
FIG. 3 is a graph to show the changes in speed of the left and right driving wheels.

If the clutch 3L is switched off, the load on the left front wheel FL is reduced and, as shown in FIG. 3, the speed VFL of the left front wheel FL increases. On the other hand, by the operation of a differential gear (not illustrated) which is mounted on the vehicle between the left and right front wheels FL, FR, the speed VFR of the right front wheel FR decreases. In this case, a controller for the cornering control which is mounted on the vehicle judges that the vehicle is turning to the right, and computes the angular velocity of rotation to the right based on the speed difference between the left and right front wheels FL, FR. The controller also computes the angular velocity of revolution based on the signals from the steering angle sensor and the lateral G sensor. In this case, the vehicle is in the straight-running condition and the angular velocity of revolution is zero, hence angular velocity of rotation >angular velocity of revolution. The controller therefore judges that the vehicle is in a condition of an oversteering and intermittently operates the brake for the left front wheel FL which is the driving wheel on the outside of cornering. Therefore, the speed VFL of the front left wheel FL, once accelerated to a certain degree, is reduced stepwise by the intermittent operation of the brake. It can thus be discriminated whether the cornering control mechanism has operated normally or not based on the changes in the deceleration dVFL of the left front wheel FL.

The deceleration dVFL, dVFR is obtained as a difference between the rotational speed VFL(n-1), VFR(n-1) detected last time and the rotational speed VFL(n), VFR(n) detected this time. If an absolute value of the difference in the left front wheel FL between the deceleration dVFL(n) (=VFL(n-1)−VFL(n)) obtained this time and the deceleration dVFL (n-1) (=VFL(n-2) - VFL (n-1)) obtained last time is taken, this absolute value exceeds a predetermined value β on the instant when the brake of the front left wheel FL is switched on (or operated) and on the instant when it is switched off (or released). If the cornering control mechanism is normal, the switching on and off of the brake is performed at least three times within the above-described predetermined time ts.

Therefore, a discrimination is made as to whether |dVFL (n)−dVFL(n-1)| has exceeded the predetermined value β or not (S8). If it has exceeded the predetermined value β, 1 is added to counter C (S9), and a discrimination is made as to whether the number of counter C has become 3 or not (S10). When C=3, a judgement is made that the cornering control mechanism is acceptable (S11). If a state of t>ts has been attained before C=3, a judgement is made that the cornering control mechanism is not acceptable (S12).

If the operator has released the pressing down of an accelerator pedal during the inspection, there is the following possibility (releasing the pressing down of the accelerator pedal is also called "switching off the accelerator"). Namely, as shown by an imaginary line in FIG. 3, the speed VFL of the left front wheel FL decreases even if the brake is not switched on. As a result, a state of |dVFL(n)−dVFL (n-1)|≧β occurs, resulting in a wrong judgement. Here, if the accelerator pedal is switched off, the deceleration dVFR of the front right wheel becomes large. If an absolute value is taken of a difference between the deceleration dVFR(n) of the right front wheel FR obtained this time and the deceleration dVFR(n-1) obtained last time, this absolute value will exceed a predetermined value a on the instant when the accelerator pedal is switched off. Then, in the present embodiment, a discrimination is made as to whether |dVFR (n)−dVFR(n-1)|≦α or not (S7). If |dVFR(n)−dVFR(n-1)|>α, a judgement is made that the accelerator pedal is switched off, and the program is returned to step S5. Only when |dVFL(n)−dVFL(n-1)|≦α, the program proceeds to step S8 and the following steps to thereby make a discrimination on the operation of the cornering control mechanism based on the deceleration dVFL of the left front wheel FL. Therefore, a wrong judgement by the wrong operation of the accelerator pedal can be prevented.

As long as the accelerator pedal is not switched off, the deceleration dVFR of the right front wheel FR is maintained below a predetermined value. In addition, when the brake of the left front wheel FL is switched on by the cornering control mechanism, the deceleration dVFL of the front left wheel FL exceeds a predetermined reference value. Therefore, it is also possible to discriminate that the brake is switched on when the deceleration dVFR is below the predetermined value and also when the deceleration dVFL is above the reference value. However, in this case, while the accelerator is kept switched off, the deceleration dVFR exceeds the predetermined value, whereby the discrimination of operation of the cornering control mechanism is prohibited. Should the discrimination of the cornering control mechanism be performed while the accelerator is switched off, there is an occasion, while the accelerator is switched off, in which the deceleration dVFL exceeds the reference value although the brake is not switched on. This results in a wrong judgement.

On the other hand, in the present embodiment, it is only when the accelerator is switched off, at which time the state of |dVFR(n)−dVFR(n-1)|>β is satisfied, that the discrimination of operation of the cornering control mechanism based on the deceleration dVFL of the left front wheel VFL is prohibited. In addition, even if the deceleration dVFL has exceeded the reference value while the accelerator is switched off, no discrimination is made that the brake is switched on unless the state of |dVFL(n) −dVFL(n-1)|≧β is satisfied, whereby no misjudgment occurs. Therefore, when the brake for the left front wheel FL is switched on by the cornering control mechanism while the accelerator is switched off, that fact can be accurately discriminated. A judgement can therefore be made accurately whether the cornering control mechanism is acceptable or not.

If the brake cannot be switched on at all due to an abnormality in the cornering control mechanism, the difference in speed between the left front wheel FL and the right front wheel FR (=VFL−VFR) sometimes exceeds the maximum upper limit value Vmax. If the clutch 3L for the left front wheel is switched on in this state, an undue force will be operated on the rack type of inspecting apparatus because the speed difference between the drum 1L for the left front wheel and the remaining drums 1R, 2L, 2R is too large. Therefore, when VFL−VFR >Vmax, a judgement is made that the cornering control mechanism under testing is unacceptable (S13). Then, a command of stopping due to abnormality is given to the operator by means of the monitor screen (S14). When the speeds of the left and right front wheels VFL, VFR have been reduced to a low speed of 0.5 km/h or less (S15), the clutch 3L is switched on (S16). The program then proceeds to the next step without performing the operation inspection of the cornering control mechanism for the right front wheel FR.

If the operation inspection of the cornering control mechanism for the left front wheel FL has been completed without attaining the state of VFL−VFR>Vmax, the clutch 3L is switched on (S17). When the speed difference between the left and right front wheels FL, FR has been reduced to a very low speed of 1 km/h or less (S18), the operation inspection of the cornering control mechanism for the right front wheel FR is started.

This operation inspection of the cornering control mechanism of the right front wheel FR is not different from the procedures of those for the left front wheel FL except that the left and right is reversed. Therefore, the reference numerals are affixed with a hyphen (') on the right upper corner of each of the corresponding reference numerals of the above-described steps for the left wheel, and their explanations are omitted.

As explained hereinabove, according to the present invention, the inspection of the cornering control mechanism can be accurately performed on the bench type of inspecting apparatus, whereby the surety of quality guarantee can be improved.

It is readily apparent that the above-described method of inspecting a cornering control mechanism of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claim is:

1. A method of inspecting a cornering control mechanism of a vehicle in which a braking force is applied to wheels on an outer side of cornering when the vehicle is oversteered and a braking force is applied to wheels on an inner side of cornering when the vehicle is understeered, said inspection being performed in a state in which each of the wheels is placed on a drum of a bench type of testing apparatus, said method comprising the steps of:

driving driving wheels of the vehicle by a driving source of the vehicle in a state in which each of said drums is coupled to each other through respective clutches;

releasing coupling of a first drum on which one of left and right driving wheels is mounted, to a second drum when a vehicle speed has reached a predetermined speed;

detecting subsequent deceleration of a first driving wheel and subsequent deceleration of a second driving wheel;

discriminating whether the cornering control mechanism has operated normally or not based on the deceleration of said first driving wheel;

discriminating, based on the deceleration of the second driving wheel, whether an accelerator has been switched off; and when a discrimination is made that the accelerator has been switched off, prohibiting the discrimination of operation of the cornering control mechanism based on the deceleration of said first driving wheel; and discriminating that the braking force is applied to said first driving wheel when a rate of change in the deceleration of the second driving wheel is below a first predetermined value and when the rate of change in the deceleration of said first driving wheel is above a second predetermined value.

2. A method according to claim 1, further comprising the step of discriminating that the braking force is applied to said first driving wheel when a rate of change in the deceleration of the second driving wheel is below a first predetermined value and when the rate of change in the deceleration of said first driving wheels is above a second predetermined value.

* * * * *